US008022867B2

(12) United States Patent
Pomerantz et al.

(10) Patent No.: US 8,022,867 B2
(45) Date of Patent: Sep. 20, 2011

(54) SATELLITE-POSITIONING-SYSTEM TRACKING DEVICE AND METHOD FOR DETERMINING A POSITION OF THE SAME

(75) Inventors: Scott Pomerantz, Wyckoff, NJ (US); Charles Abraham, Los Gatos, CA (US); David A. Lundgren, Mill Valley, CA (US)

(73) Assignee: Broadcom Corporation, Irvine, CA (US)

( * ) Notice: Subject to any disclaimer, the term of this patent is extended or adjusted under 35 U.S.C. 154(b) by 558 days.

(21) Appl. No.: 11/655,786

(22) Filed: Jan. 19, 2007

(65) Prior Publication Data
US 2007/0182628 A1    Aug. 9, 2007

Related U.S. Application Data

(60) Provisional application No. 60/760,140, filed on Jan. 19, 2006.

(51) Int. Cl.
*G01S 19/06* (2010.01)
*G01S 19/25* (2010.01)
(52) U.S. Cl. .............................. 342/357.43; 342/357.64
(58) Field of Classification Search ............. 342/357.06, 342/357.09, 357.1, 357.43, 357.64
See application file for complete search history.

(56) References Cited

U.S. PATENT DOCUMENTS

| 5,847,545 | A  | * | 12/1998 | Chen et al. ..................... 320/138 |
|---|---|---|---|---|
| 6,700,533 | B1 | * | 3/2004 | Werb et al. ............... 342/357.09 |
| 6,791,477 | B2 | * | 9/2004 | Sari et al. ................. 342/357.09 |
| 2002/0027524 | A1 | * | 3/2002 | Pippin ...................... 342/357.08 |
| 2005/0043038 | A1 | * | 2/2005 | Maanoja et al. ........... 455/456.1 |
| 2005/0153687 | A1 | * | 7/2005 | Niemenmaa et al. ...... 455/414.2 |
| 2007/0096981 | A1 | * | 5/2007 | Abraham ................. 342/357.09 |

OTHER PUBLICATIONS

Garmin Forerunner 201 Owner's Manual, p. x, Oct. 2003.*

* cited by examiner

*Primary Examiner* — Thomas H Tarcza
*Assistant Examiner* — Fred H Mull
(74) *Attorney, Agent, or Firm* — McAndrews, Held & Malloy, Ltd.

(57) ABSTRACT

A global navigation satellite system-tracking ("GNSS-tracking") device and method for determining one or more positions of the GNSS-tracking device utilizing a user-plane service is disclosed. The GNSS-tracking device may comprise: charging and tracking modules adapted to be disengagably coupled together, wherein the tracking module comprises (i) tracking circuitry for determining at least one position of the tracking module using the user-plane service in a satellite positioning system, and (ii) a chargeable source for supplying power to the tracking circuitry when disengaged from the charging module, and wherein the charging module is operable to charge the chargeable source when the charging module is coupled to the tracking module.

19 Claims, 5 Drawing Sheets

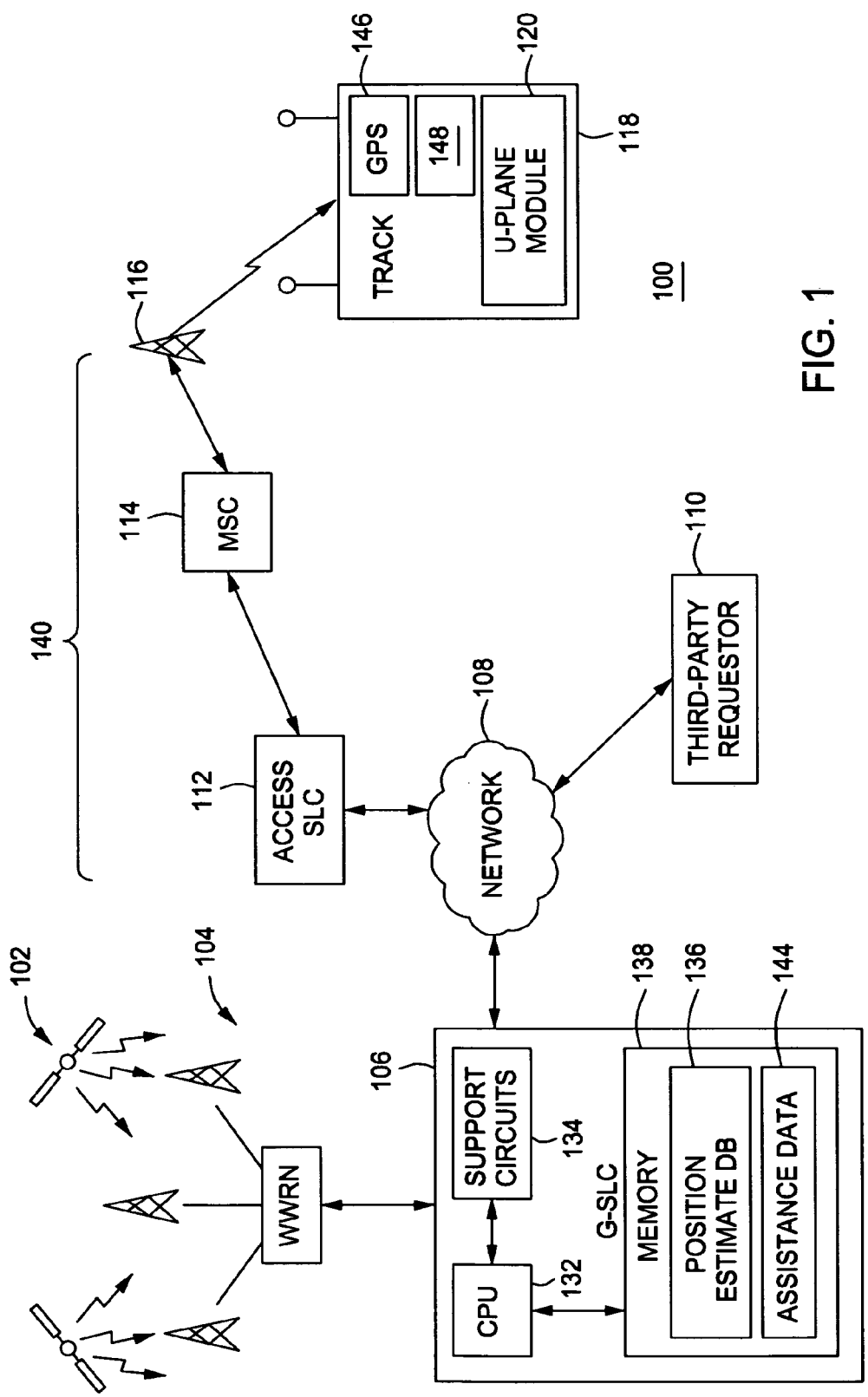

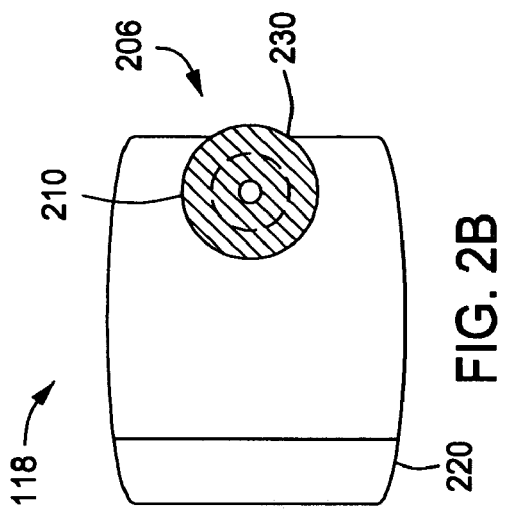
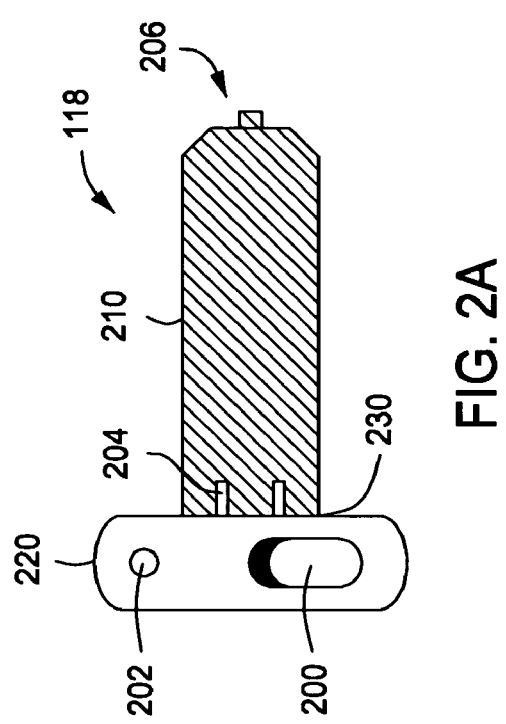
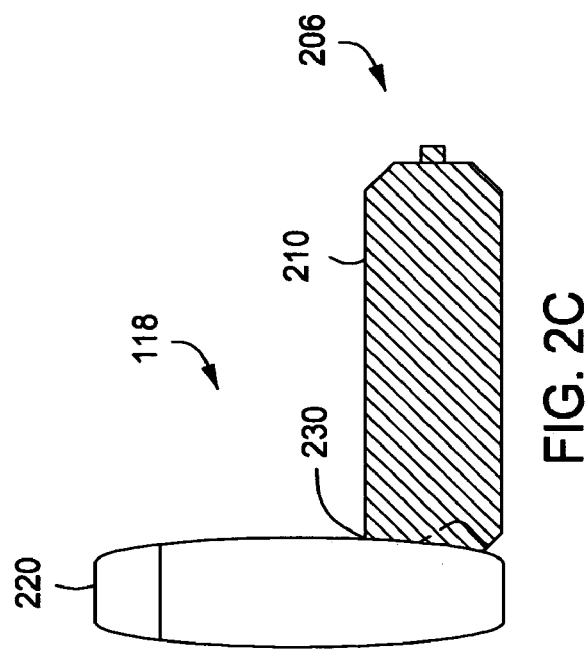

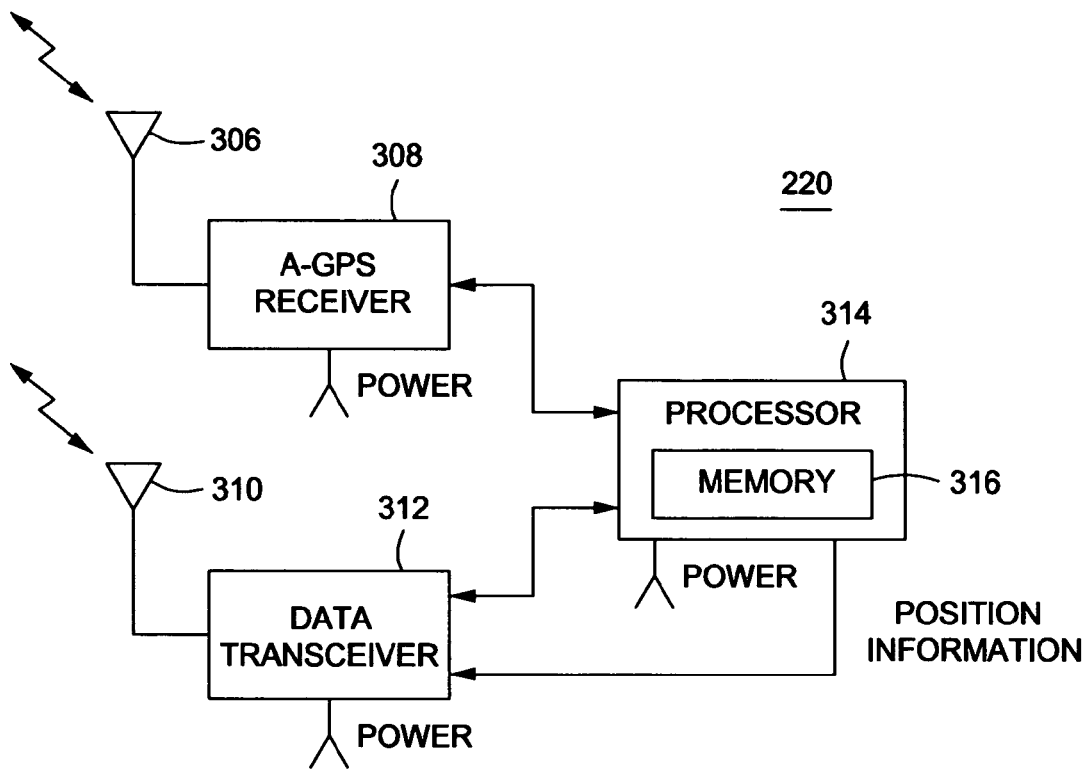
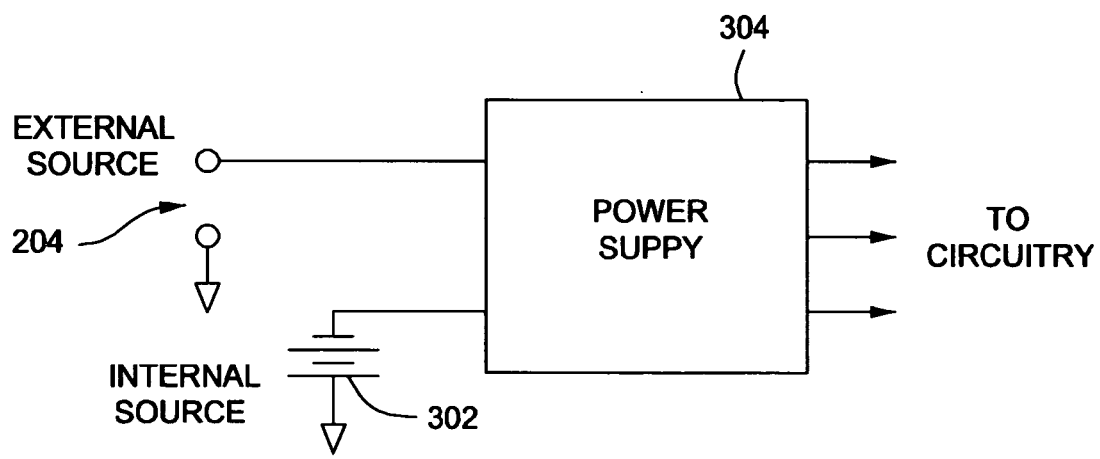
FIG. 3

SATELLITE-POSITIONING-SYSTEM TRACKING DEVICE AND METHOD FOR DETERMINING A POSITION OF THE SAME

CROSS-REFERENCE TO RELATED APPLICATIONS

This application claims benefit of U.S. provisional patent application Ser. No. 60/760,140, filed Jan. 19, 2006, which is herein incorporated by reference.

BACKGROUND

1. Field of the Invention

The following generally relates to satellite position location systems, and more particularly, to a system, device and method for providing location services using an assisted-Global Navigation Satellite System ("A-GNSS").

2. Background of the Related Art

A Global Navigation Satellite System ("GNSS") is a system that uses a constellation or plurality of satellites orbiting the earth along with a number of terrestrial devices, such as a positioning receiver, to determine a position anywhere on the earth. The SPS (Satellite Positioning System) is generally unlimited in its coverage area; provides continuous 24-hour coverage regardless of weather conditions; and is highly accurate. A Global Positioning System ("GPS"), GLONASS and GALILEO are examples of the GNSS. In operation, each of the satellites in the constellation continually emits a radio frequency signal ("satellite signal") at a predetermined frequency.

To determine its position, the positioning receiver may acquire its position on ground, in air or in space based upon the reception of satellite signals from each of a number of the satellites in view of the positioning receiver ("in-view satellites"). To facilitate such determination, the positioning receiver extracts from each of such satellite signals a time of transmission of such satellite signal ("transmission time").

Using the transmission time and a time of reception of each of the satellite signals at the positioning receiver ("reception time"), the positioning receiver computes a time delay, which, on a very basic level, is a function of the difference between the transmission and reception times. When computing the delay time, the positioning receiver may also take into account a number of adjustments to (i) normalize differences in time domains between the positioning receiver and the satellite that transmitted the satellite signal, and/or (ii) compensate for atmospheric conditions that affect the transmission time of the satellite signal.

After calculating the time delay, the positioning receiver may multiply the time delay by the speed of light to obtain a distance between the positioning receiver and the satellite that transmitted the satellite signal. By iteratively determining a distance between the positioning receiver and three or more of the remaining in-view satellites, the positioning receiver can determine its position. This process of iteratively determining a distance may be performed by calculating pseudo-ranges of the satellites.

When the satellite signals are attenuated and/or delayed, however, the positioning receiver cannot calculate the pseudoranges. The satellite signals may be attenuated accurately during their transmission from the satellites to the positioning receiver as a result of buildings, trees, vehicle roof and the like. In some applications of GNSS, such as determining a position (e.g., a location) of a cellular telephone or personal navigation device, when the satellite signals are unacceptably attenuated ("attenuated signals"), then the attenuated signals (i) may not be detected, or (ii) if detected, the attenuated signals cannot be processed or the time required to process is excessive. To improve the processing of the satellite signals the positioning receiver is provided with assistance data.

The assistance data may include time and frequency information, pseudorange estimation information, position estimation information, ephemeris information, and the like. Commonly assigned U.S. Pat. No. 6,453,237 issued Sep. 17, 2002 describes examples of using assistance data for an assisted-GPS (A-GPS) system, and is incorporated herein by reference in its entirety.

Transmission of assistance data to a GNSS receiver is typically performed via a cellular telephone network. The cost of continuously receiving assistance data via a cellular telephone network is very high. Additionally, a cellular telephone transceiver must be coupled to the GNSS receiver to facilitate reception of the assistance data. Such a cellular transceiver results in unwarranted size, complexity and high cost for a GNSS receiver that is to be used for asset tracking only, i.e., without utilization of the cellular transceiver except for assistance data reception.

Thus, there is a need in the art for a simple GNSS tracking device that utilizes assistance data and a method for determining one or more positions of the GNSS-tracking device.

SUMMARY

The present invention is directed to a global navigation satellite-system-tracking ("GNSS-tracking") device and method for determining one or more positions of the GNSS-tracking device utilizing a user-plane service is disclosed. The GNSS-tracking device may comprise: charging and tracking modules adapted to be disengagably coupled together, wherein the tracking module comprises (i) tracking circuitry for determining at least one position of the tracking module using the user-plane service in a satellite positioning system, and (ii) a chargeable source for supplying power to the tracking circuitry when disengaged from the charging module, and wherein the charging module is operable to charge the chargeable source when the charging module is coupled to the tracking module.

BRIEF DESCRIPTION OF THE DRAWINGS

So that the manner in which the above recited features are attained and can be understood in detail, a more detailed description, which is briefly summarized above, is described below with reference to the Figures illustrated in the appended drawings.

It is to be noted that the Figures in the appended drawings, like the detailed description, are examples. And as such, the Figures and the detailed description are not to be considered limiting, and other equally effective examples are possible and likely. Furthermore, like reference numerals in the Figures indicate like elements: wherein:

FIG. 1 is a first block diagram illustrating an example of a system for tracking and/or providing location-based services to one or more of a plurality of global navigation satellite-system (GNSS) tracking devices;

FIGS. 2A, 2B and 2C depict three perspective views of an illustrative form factor of a one embodiment of a GNSS tracking device;

FIG. 3 depicts cutaway views each illustrating respective top views and side views of one embodiment of a GNSS tracker and an associated charger module;

DETAILED DESCRIPTION

Figure 4:
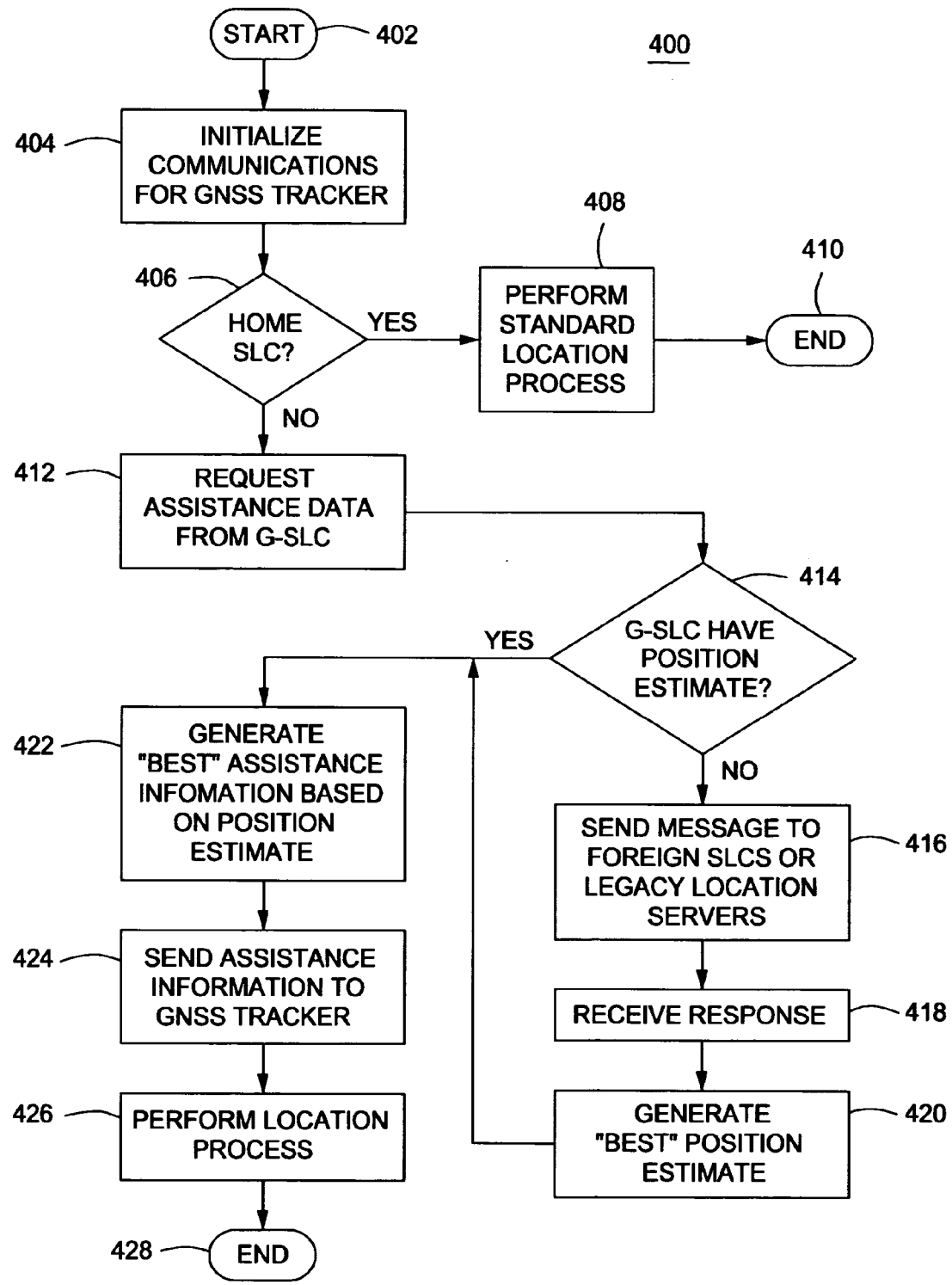
FIG. 4 is a flow diagram of one embodiment of a method for tracking a GNSS tracking device.

The following disclosure includes a description of a global navigation satellite-system-tracking ("GNSS-tracking") device as well as a method and system for determining one or more positions of the GNSS-tracking device; that is, tracking the GNSS-tracking device. In the following description, numerous specific details, including details about computing platforms, global navigation satellite systems ("GNSS"), wireless communication systems and protocols thereof, are set forth to provide a thorough understanding of the examples described herein.

However, it will be understood that these examples may be practiced without these specific details. In other instances, well-known methods, procedures, components and techniques are not set forth in particular detail, so as not to obscure the following description. Further, the examples disclosed herein are for exemplary purposes only and other examples may be employed in lieu of or in combination with of the examples disclosed.

For convenience, the following description provides details in terms of architecture and operations of a global positioning system ("GPS") that may be used for commercial purposes. Herein, the term GPS is used as a particular example of an GNSS that may benefit from the invention. For example, those skilled in the art will appreciate that the GNSS-tracking device may be embodied as one (or a combination) of various types of mobile or wireless devices, such as a cellular telephone, a pager, a laptop computer, a personal digital assistant ("PDA"), one or more architectural examples that are described below, and like, that is "location enabled."

Generally, location enabling of the GNSS-tracking device is facilitated by including therein a capability of receiving and processing satellite signals of the GNSS, which may be signals from a Global Positioning System ("GPS signals"). Thus, the GNSS-tracking device may include (i) a receiver for receiving the GPS signals ("GPS receiver"), and (ii) a processor for processing the GPS signals ("GPS processor"). Collectively, the SPS-tracking device is referred to herein as a "GNSS Tracker." Those skilled in the art will understand, however, that the invention and the detail described herein are applicable to any other GNSS, such as GLONASS, GALILEO and the like.

FIG. 1 is a block diagram illustrating an example of a system 100 for tracking and/or providing location-based services to one or more of a plurality of GNSS Trackers, such as GNSS Tracker 118. The system 100 includes a constellation of satellites ("constellation") 102 from which a worldwide reference network ("WWRN") 104 obtains GNSS signals and then processes the GNSS signals to form the assistance data; a user-plane location center 106 (in one embodiment referred to herein as a global secure-user-plane location center, or "G-SLC") that (i) receives and stores the assistance data ("assistance data 144") from the WWRN 104, and (ii) supplies the assistance data 144 to the GNSS Tracker 118 via a communication network 108 and/or a terrestrial wireless access communications network ("access network") 140. The GNSS system 100 also includes a third-party requestor 110 for obtaining one or more positions of (i.e., tracking) the GNSS Tracker 118.

The WWRN 104 may embody, for instance, any example of a world wide reference network, such as is disclosed in the commonly-assigned, U.S. Pat. Nos. 6,411,892; 6,813,560; 6,587,789; 6,704,651; 6,703,972; and U.S. patent application Ser. Nos. 10/359,468, filed on Feb. 5, 2003; 10/719,890, file Nov. 21, 2003; 11/077,380, filed on Mar. 3, 2005; 11/206,615, filed on Aug. 18, 2005; 09/993,335, filed Nov. 6, 2001; 10/926,792, filed Aug. 26, 2004; 10/349,493, filed Jan. 22, 2003, and the like. As noted therein and above, the WWRN 104 may process the satellite signals from one, some or all of the GNSS satellites in the constellation 102 to obtain, produce or otherwise form the assistance data, which may include timing and/or ephemeris information for such GNSS satellites.

The WWRN 104 may then aggregate the assistance data for use by the GNSS Tracker 118. This assistance data may be standard-term assistance data or long-term-orbit assistance data, such as is described in commonly assigned U.S. Pat. Nos. 6,542,820, 6,560,534, 6,651,000 and/or 6,829,535; and U.S. patent application Ser. Nos. 10/674,267, filed Sep. 9, 2003, and 11/057,060, filed Feb. 11, 2005; all of which are incorporated herein by reference in their entirety.

The WWRN 104 may supply the assistance data to the G-SLC 106. The G-SLC 106, which includes a central-processing unit ("CPU") 132, memory 136, and supports circuits 134, may store the assistance data 144 in its memory 136.

The CPU 132 may be one or more conventional microprocessors and/or microcontrollers. The support circuits 134 facilitate the operation of the CPU 132 and comprise well-known circuits, such as input/output circuits, cache, dock circuits, power supplies, network interface circuits and the like. The network interface circuit of the support circuits 134 is used for receiving and transmitting the TCP/IP messages in support of SUPL services.

The memory 136 may store various software packages that are used to operate the G-SLC 106. The memory 136 may comprise random access memory, read-only memory, optical storage, magnetic storage, removable storage, and combinations thereof.

In addition to housing the stored assistance data 144, the memory 136 may contain a position-estimate database 138 that houses positioning information that can be used for deriving the position estimates (e.g., latitude and longitude) from the Cell_IDs for all BSSs in the communication network 108 and the access network 140, which collectively can include all BSSs located anywhere in the world. To populate the position-estimate database 138, the G-SLC 106 may contact each SLC in the world and/or each legacy location servers to request positioning information for each Cell_ID covered by such network entities. These SLCs may be contacted via the communication network 108 using the SUPL-protocol messages and addressing such messages to IP addresses of associated with the SLCs.

Contacting the legacy location servers may be performed using a communication protocol, such as the Mobile Location Protocol ("MLP"). The MLP uses an HTTP transport to address the servers and request the positioning information. The G-SLC 106 may select a protocol, including SUPL, MLP, or any other appropriate protocol that is appropriate in contacting a server having the positioning information for the Cell_ID used by the GNSS Tracker 118.

The G-SLC 106, usually upon request, may supply the assistance data 144, and the position estimates (collectively "assistance information") to the GNSS Tracker 118 via the communication and the access networks 108,140. To facilitate this, the user-plane service may be used. One example of a user plane service is an Internet-based protocol known as the Secure User Plane Location (SUPL) Standard defined by Open Mobile Alliance (OMA). Other user plane services may be used. Using the SUPL service, the assistance information can be accessed, and then distributed to the GNSS Tracker 118, using the TCP/IP messages, via the communication and access networks 108, 140.

The communication network 108 may be a partial or full deployment of most any telecommunication or computer network. As such, the communication network 108 may be or include any part of a public or private, terrestrial wireless or satellite, and/or wireline telecommunications and/or computer network. For example, the communication network 108 may include portions of a Public Switched Telephone Network ("PSTN"), the Internet, proprietary public networks, other wired voice and packet-data networks, and/or wireless voice and packet-data networks, such as, 1G, 2G, 2.5G, 3G, IEEE 802 et seq. and Bluetooth telecommunication networks. Accordingly, the communication network 108 may include circuit-switched as well as packet-data elements.

Being configured to be or include one or more public wired and/or wireless networks, the communication network 108 allows a supplier of services ("service provider") to provide the assistance information in a particular, albeit wide-ranging, geographic coverage area to its subscribers. These subscribers are, generally, any interested member of the public meeting minimal criteria, and of particular interest here, are one or more of the end users, such as the GNSS Tracker or third-party requestor 110, which desire to track the GNSS Tracker 118.

Like the communication network 108, the access network 140 may be or include any part of a public or private, terrestrial wireless or satellite, and/or wireline telecommunications and/or computer network. As such, the access network 140 may be configured to communicate the assistance information using any number of protocols and in any manner consistent with providing the assistance information to the GNSS Tracker 118. These protocols may include standardized, proprietary, open-source, and freely-available communication protocols for communicating content in circuit-switching and/or packet data networks, including, for example, the communication protocols noted above.

To provide the assistance information to the GNSS Tracker 118, the access network 140 may include a few or, alternatively, many network elements, most of which are not shown. Of these elements, the access network 140 may include an access SLC 112, a mobile switching center ("MSC") 114 and a base station subsystem ("BSS") 116 to provide a path between the communication network 108 and the GNSS Tracker 118. Over this path, the assistance information may be provided to the GNSS Tracker 118.

The assistance information supplied to the GNSS Tracker 118 via the access network 140 (and the communication network 108) generally includes information that is applicable to a geographic regions covered by the access network 140. For instance, the assistance information supplied to GNSS Tracker 118 may include timing and/or ephemeris information for the satellites of the constellation 102 that may be viewed within the geographic region covered by the access SLC 112, the MSC 114 and/or the BS 116 (or other element of the access network 140) at a given interval of time.

The geographic region covered by the access network 140 may be either a home territory or a roaming territory. The access SLC 112, like the G-SLC 106, may include an access-position-estimate database for housing positioning information that can be used for deriving position estimates (e.g., latitude and longitude) from a Cell_ID associated with the BSS 116. The access SLC 112, usually upon request, may supply the assistance information corresponding to the Cell_ID associated with the BSS 116, which may be, for example, any of the home or roaming territories. Within either the home or roaming territories, the GNSS Tracker and the access network 140 (via the BSS 116) may exchange content in a conventional manner using, for example, GPRS (or any other air-interface) protocol.

To facilitate such communication, the GNSS Tracker 118 may include a wireless transceiver (or a portion thereof) 148 for exchanging content with the BSS 116 (and in turn, the access network 140, the communication network 108 and the G-SLC 106), a GNSS receiver (or a portion thereof) 146 for obtaining the GNSS signals, and a user-plane ("U-plane") module 120 for exchanging the assistance information and Cell_ID with the access SLC 112 (and/or the G-SLC 106) as described in commonly assigned U.S. patent application Ser. No. 11/261,413, filed Oct. 28, 2005. One example of a user plane service that uses an Internet-based protocol is the Secure User Plane Location (SUPL) Standard as defined by Open Mobile Alliance (OMA). Other user plane services may be used. The wireless transceiver 148 and the GNSS receiver 146 may be separate entities or integrated with, integral to or otherwise combined with each other.

Details of examples of the wireless transceiver 148 and the GNSS receiver 146 may be found in commonly-assigned U.S. Pat. Nos. 6,829,534; 6,813,560; 6,417,801; 6,734,821, 6,937,187; 6,606,346, 6,704,348, 6,819,707; and 6,891,880, and U.S. patent application Ser. Nos. 10/265,090, filed Oct. 4, 2002; 10/218,110, filed Aug. 12, 2002; 10/394,404, filed Mar. 21, 2003; 10/690,973, filed Oct. 22, 2003; 09/993,335, filed Nov. 6, 2001; 10/372,015, filed Feb. 20, 2003; 10/345,604, filed Jan. 16, 2003; 10/349,493, filed Jan. 22, 2003; and any continuation and divisional application thereof; all of which are incorporated herein by reference in their entirety. As such, the wireless transceiver 148 and the GPS receiver 146 may include any number of components, including one or more oscillators that may be shared between or dedicated to the wireless transceiver 148 and the GPS receiver 146; oscillator synchronization circuits for synchronizing the oscillators; frequency detectors; frequency counters; correlators, highly-parallel or otherwise, which may include numerically-controlled oscillators for detecting the GPS signals; front-end circuitry for the wireless transceiver 148 and the GPS receiver 146; wireless and GPS tuners; temperature models for adjusting the oscillators; co-processors; and the like.

FIGS. 2A, 2B and 2C depict three perspective views of an illustrative GNSS Tracker, such as GNSS Tracker 118. The GNSS Tracker 200 includes a charger module 210 that is disengagably (and optionally, hingedly) coupled to a tracker module 220 at interface 230. The tracker module 220 comprises the electronic circuitry for receiving and processing GNSS signals, for receiving assistance information, and for transmitting a computed position to a communications network. This circuitry is housed in a small package (e.g., 2.5 inches by 1.75 inches) that can comfortably fit in a pocket. The tracker module comprises an activation switch 200 (e.g., a slide switch) and an activation indicator 202 (e.g., a light emitting diode (LED)).

The charger module 210 is coupled to the tracker module 220 via a pair of conductive prongs 204. The prongs 204 are pivotably attached to the tracker module 220 such that, the prongs can be "folded" into the body of the tracker module 220 when the tracker module is detached from the charger module 210. When used, the prongs 204 are inserted into a matching pair of receptacles in the charger module 210 to facilitate power transfer from the charger to the tracker module 220. Alternatively, the prongs 204 may extend from the charger module 210 and plug into matching receptacles formed in the tracker module 220. These prongs may pivot into slots in the charger module 210 during storage.

The charger module 210 depicts an interface 206 for a cigarette lighter. The pivotal nature of the prongs enables the tracker module 220 to be pivoted with respect to the charger module 210 to facilitate fitting the GNSS tracker 118 into any space when charging. Alternatively, the interface 206 may be designed to plug into an AC power receptacle or the like.

FIG. 3 depicts a block diagram of the tracker module 220, in turn, includes a plurality of elements for enabling the tracking of the GNSS Tracker 118, including a rechargeable power source (e.g., battery 302), to supply electrical energy to the plurality of elements when disengaged (or engaged) with the charger module 210. The charger module 210 includes a plurality of well-known elements for transforming electrical energy provided from external power sources through prongs/receptacles 204 into the electrical energy for charging (or recharging) the rechargeable power source of the tracker module 220. The power supply 304 converts the power from the charger module 210 or battery 302 to various voltage levels used by the circuitry of the tracker module 220.

The tracker module 220 further comprises a GNSS antenna 306, a GNSS receiver 308, a processor 314, a data transceiver 312 and a transceiver antenna 310. The components are generally arranged upon a single substrate. The GNSS antenna, for example, may be a SARANTEL GPS antenna, the transceiver antenna may be, for example, a SKYCROSS GSM antenna, and the GNSS receiver 308, transceiver 312 and processor 314 may be, for example, an ENFORA GSM/GPS Modem and SIM Carrier. These components are merely illustrative of the types of components that are available.

The rechargeable power source 302 may take the form of a gel battery, a lead-acid battery, a nickel-cadmium battery, a nickel metal hydride battery, a lithium ion battery, a lithium polymer battery, a zinc bromide battery, a proton exchange membrane fuel cell, a polymer electrolyte membrane fuel cell, a formic acid fuel cell, and the like. As noted, the rechargeable power source 302 supplies its stored electrical energy to power the electronic circuits when (i) disengaged from the charger module 210 and (ii) the on/off switch 300 is switched to an ON position.

In addition, the rechargeable power source 302 may supply power to the electronic circuits when (i) the tracker module 220 is engaged with the charger module 210, and (ii) the on/off switch 200 is switched to an ON position. Alternatively, the power supply 304 may (i) couple transformed electrical energy supplied from the charging module 210 to the rechargeable power source 302 for charging (or recharging), and/or (ii) route the transformed electrical energy to the electronic circuits without drawing from the rechargeable power source 302 when the tracker module 220 engaged with the charger module 210 and when the on/off switch 200 is switched to the ON position.

The wireless data transceiver 312 and GNSS receiver 308 each of which may be formed from hardware, software and firmware. Although the wireless data transceiver 312 and the GNSS receiver 308 may be separate entities, the circuits are typically integrated with; integral to or otherwise combined with each other. This potentially allows a reduction of redundant elements and potentially eliminates errors caused by non-interoperability between components of the wireless data transceiver 312 and GNSS receiver 308.

In addition, the A-GNSS receiver 308 may be embodied as any AGNSS processor, such as the aforementioned GL-20000 and HAMMERHEAD Processors available from Global Locate, Inc. of San Jose, Calif., which can process the assistance data to allow the GNSS Tracker 118 to locate the in-view satellites. The memory 316 may be random access memory, read-only memory, optical storage, magnetic storage, removable storage, and variations and/or combinations thereof.

The memory 316 can be used to store the assistance information (e.g., the assistance data 144, the Cell_ID, and position estimate) along with one or more previously-determined positions of the GNSS Tracker 118. The memory 316 may also store one or more software routines used for controlling the operation of the tracker module 220. As such, responsive to a request for tracking the GNSS Tracker 118, the software may supply one or more these previously-determined positions as the GNSS-Tracker position.

By supplying the previously-determined positions (as opposed to generating a new GNSS-Tracker position), the GNSS Tracker 118 may conserve energy stored in the rechargeable power source 302. Such conservation may be realized by not having to operate the GNSS receiver 308 and associated portions of the electronic circuits, and/or not having to operate the wireless transceiver 312 and associated electronics circuits for obtaining the assistance information. This becomes especially useful when the GNSS Tracker 118 (collectively, or the tracker module 220 alone) is at a location where the attenuated-GNSS signals are present (e.g., inside a building, underground, covered by shielding, inside a backpack, inside a locker, inside a trunk of a vehicle, etc), and thus, are too attenuated to detect and/or too costly (in terms of power usage) to process the attenuated-GPS signals. Also, supplying the previously-determined positions are useful when the on/off switch 200 is switched to the OFF position or when the energy stored in the rechargeable power source 302 is at a level that is insufficient to generate a new GNSS-Tracker position.

Although the wireless transceiver 312 may be used to respond to a request for tracking the GNSS Tracker 118 from the third-party requestor 110, and thereby consume some of the energy stored in the rechargeable power source 302, the GNSS Tracker 118 may still conserve such energy as noted above by supplying the one or more of the previously-determined positions instead of generating a new GNSS-Tracker position. This way, the energy used is a portion of the energy to support the wireless transceiver 312 and associated circuits for supplying the previously-determined positions.

The previously-determined positions may be supplied with other information, such as corresponding times of determining the previously-determined positions. Alternatively, the previously-determined positions may be supplied as a function of threshold criteria, such as difference in time since determining the previously-determined positions and the present time and/or inconsistencies in positions in the previously-determined positions (e.g., having two or more positions geographically spaced apart such that attaining the positions is impossible based on differences in times of determining the previously-determined positions).

Once activated, the GPS Tracker 118 is configured via a configuration website (third party requestor 110 of FIG. 1). During configuration, the GPS Tracker 118 has various configuration parameters set and stored in memory 316, including the periodicity of the tracker to compute and send a position, store a unique user identification code, and the like. When establishing periodicity, the tracker can be configured to only compute a position and report the position when a request for position is received. Alternatively, the computation can be performed periodically, e.g., every 5, 10, 20 or 30 minutes. Upon each computation, the position is stored in the Tracker and reported to the network. If the Tracker is incapable of computing a position when required, the previously computed position may be transmitted. Configuration is generally performed wirelessly. However, alternatively the configuration could be performed locally through a USB, infrared, Bluetooth or other connection between the tracker module 220 and a computer.

After configuration is complete, the GPS Tracker 118 finds many uses. The simple cigarette lighter charger enables the unit to be plugged into a plurality of vehicles within a fleet. The vehicles can then be tracked. Alternatively, the GPS Tracker 118 can be disconnected from the charger module 210 and placed in a child's backpack or pocket such that parents can monitor the whereabouts of their children. In other situations, parents can track a teenager's position of their vehicle, or a caregiver may track the patient's whereabouts. In other embodiments, geo-fences may be established such that, when the GPS Tracker leaves a predefined geographic region, a warning message is sent to another person, e.g., caregiver, parent, employer, and the like. The message may be transmitted via email, cell phone, telephone, short message service (SMS) and the like.

Referring back to FIG. 1, when a location-based service is requested, (for example, when a request for obtaining or determining a position of the GNSS Tracker 118 is requested), the access network 140, or more particularly, the BSS 116 may receive from the GNSS Tracker 118 via its wireless transceiver 148 a request for the assistance information (i.e., the assistance data 144 and the position estimate information) to assist the GNSS Tracker 118 in determining the GNSS-Tracker position.

The GNSS Tracker 118 may initiate and then process the request for the assistance information ("assistance-information request") through a TCP/IP stack to form a TCP/IP message. The TCP/IP message may be further processed by the U-plane module 120 to form a SUPL-encapsulated message. The GNSS Tracker 118 via its wireless transceiver 148 may send the SUPL-encapsulated message to the BSS 116 via GPRS (or other air interface) using a SUPL layer.

Alternatively, if the third-party requestor 110 (as opposed to the GNSS Tracker 118 itself) requests a position of the GNSS Tracker 118, the third-party requestor 110 may notify the GNSS Tracker 118 to initiate the assistance-information request. To do this, the third-party requestor 110 may, for example, utilize a conventional short-message service ("SMS") or wireless-access protocol ("WAP") message to provide to the access SLC 112 (via the communication network 108) and the GNSS Tracker 118 (via the MS 114 and BSS 116) a notification message to initiate the assistance-information request.

As another example, which is discussed in detail with respect to FIG. 5 below, the notification message may be delivered as a telephone call, a TCP/IP packet, an e-mail message, and the like. This way, the third-party requestor 110 can notify the access SLC 112, and in turn, the GNSS Tracker 118 to initiate the assistance-information request using a telephone call, a internet-based (e.g., a TCP/IP) message, an e-mail message, and the like. To facilitate providing the internet-based message, the third-party requestor 110 may use a web-based interface through which the internet-based message is exchanged with the access SLC 112 and the GNSS Tracker 118.

Response to the notification message from the third-party requestor 110, the access SLC 112 may pass notification message to the GNSS Tracker 118. After receipt, the GNSS Tracker 118 may initiate the assistance-information request. To do this, the GNSS Tracker 118 may establish a TCP/IP communication pipe between itself and the access SLC 112. As part of establishing the TCP/IP communication pipe, the GNSS Tracker 118 may be assigned a dynamic TCP/IP address (assuming one is not already assigned).

After the communication pipe is established and the TCP/IP address is assigned, the access SLC 112 sends the assistance information, using TCP/IP, to the GNSS Tracker 118. Using the assistance information, the GPS receiver 146 of the GNSS Tracker 118 acquires and processes the GPS satellite signals of the in-view satellites.

The GNSS-Tracker position may be calculated by different entities depending on which operational mode the GNSS Tracker 118 is operating, which can be one of two operation modes. In the first of the two operation modes, GNSS-Tracker position may be calculated by the GNSS Tracker 118. This first operation mode is referred to herein as a Tracker-based mode. When using the Tracker-based mode, the GNSS-Tracker position is either used locally by the GNSS Tracker 118 or sent to the access SPC 112 for transmission to the third-party requestor 110, depending upon whether the GNSS Tracker 118 or the third-party requester 110 initiated the request for tracking the GNSS Tracker 118.

In the second of the two operation modes, GNSS-Tracker position may be calculated by a network element, such as the access SLC 112. This second operation mode is referred to herein as a Tracker-assisted mode.

In the Tracker-assisted mode, received-GPS signal information is sent to the access SLC 112 (or other appropriate network entity). The access SLC 112 (or other appropriate network entity) uses the received GPS signal information to calculate the GNSS-Tracker position. The GNSS-Tracker position is sent to the third-party requestor 110.

In some home or roaming territories, the access SLC 112 may not exist. As such, the GNSS Tracker 118 may use the TCP/IP address of the G-SLC 106 to receive stored information. As described below, the G-SLC 106 may be used by default or as a "back-up" when the access SLC 112 is not able to or cannot provide the stored information with sufficient accuracy.

For example, when GNSS Tracker 118 is not operating in its home territory, but rather is operating in a roaming territory, the GNSS Tracker 118 may use U-plane module 120 to invoke the SUPL service to communicate to the BSS 116, which is located in the roaming territory. The GNSS Tracker 118 addresses, by foreign Cell_ID, the request for the assistance information to a SLC in its home territory. The access SLC 112, however, might not be able to determine the position estimate for the GNSS Tracker 118 because the foreign Cell_ID is not in the Cell_ID database of the access SLC 112, but rather in a Cell_ID database accessible to the SLC in its home territory.

If the position estimate is not available, the access SLC 112 may alternatively request the position estimate from an SLC in the roaming territory ("roaming SLC") by sending to it the foreign Cell_ID. The roaming SLC may respond to the access SLC 112 with the position estimate corresponding to the foreign Cell_ID. To facilitate this, the access SLC 112 must know an IP address assigned to the roaming SLC, which might not be known to the access SLC 112, and thus, is problematic. Assuming, however, the access SLC knows the IP address assigned to the roaming SLC and receives a position estimate therefrom, this position estimate might not contain the appropriate assistance information for roaming territory, and this too, is problematic.

Since the G-SLC 106 contains the assistance information, which is applicable to any location; the GNSS Tracker 128 may address the assistance-information request to the G-SLC 106 (e.g., to an IP address assigned to the G-SLC 106). The GNSS Tracker 128 may (i) automatically address the assistance-information request to the G-SLC 106 when operating in the roaming territory, (ii) address or redirect the assistance-information request to the G-SLC 106 when instructed to do so by the access SLC 112, and/or (iii) address or redirect the assistance-information request to the G-SLC 106 when the access SLC 112 cannot determine a position estimate or send accurate assistance data.

In any case, the G-SLC 106 may respond by sending the assistance information to the IP address of the GNSS Tracker 118, the access SLC 112 or some other network entity. The GNSS Tracker 118, the access SLC 112 or the other network entity, depending on the operational mode of the GNSS Tracker, may uses the assistance information, which is applicable to the in-view satellites in the roaming territory, to enhance a sensitive of the GPS receiver 146 and/or improve a speed of acquiring the GPS signals.

If a Cell_ID is not available at all or may not be accurate, then the G-SLC 106 uses whatever information is available for providing the position estimate of the GNSS Tracker 118. This information may be, for example, a country code of the associated with the identity of the GNSS-Tracker 118; hemisphere of operation of the GNSS Tracker 118, and the like. In such case, the G-SLC 106 provides what is referred to herein as "best-available" assistance data.

The best-available assistance data may provide the most accurate position of the GNSS Tracker 118 at a given initial position estimate of a particular accuracy. As such, the best-available assistance data that is provided to the GNSS Tracker 118 may be dependent upon the accuracy of the initial position estimate. For example, if only the country of operation is known, the G-SLC 106 sends the best-available assistance data that is relevant to a geographic location of the country. This may include, for example, satellite orbit information (ephemeris, orbit models, pseudo-range models, and the like as well as time of day and other information) for satellites in view of any GNSS Tracker anywhere in that country.

If no position estimate is available at all, the G-SLC 106 may send satellite orbit information for all the GNSS satellites in the constellation 102. Alternatively, the G-SLC 106 may utilize an "intelligent" algorithm that predicts a possible location of the GNSS-Tracker 118 based upon a last known previously-determined positions or a GNSS-Tracker position that is extrapolated from one or more of the previously-determined positions. From the previously-determined positions, the G-SLC 106 may create an optimal set of assistance information that may be used to acquire the GPS signals and, ultimately, determine the GNSS-Tracker position.

FIG. 4 is a flow diagram illustrating an example of a method 400 for tracking a GNSS Tracker, such the GNSS Tracker 118. Although the method 400 may be performed by any appropriate architecture, for convenience, the method 400 is described with reference to the architecture of the system 100 of FIG. 1.

The method 400 begins at process block 402 and proceeds to process block 404. At process block 404, the method 400 initializes communications with the GNSS Tracker 118.

A discussed below with respect to FIG. 5, such initialization may occur in response to a request for tracking the GNSS Tracker 118 ("GNSS-Tracking request"). This GNSS-Tracking request may be initiated by the third-party requestor 110 or the GNSS Tracker 118. In either instance, the GNSS Tracker 118 may be dynamically assigned with an IP address to facilitate exchange of TCP/IP messages between the GNSS Tracker, the access network 140, the communication network 108 and the G-SUPL 106.

At decision block 406, the method 400 queries the access SLC 112 for the assistance information. If the access SLC 112 can provide a Cell_ID and a position estimate, which can be resolved into useable assistance data (e.g., ephemeris and timing information of the in-view satellites), then the method 400 proceeds to process block 408.

At process block 408, a standard location process is performed using the assistance data to enhance receiver sensitivity and/or improve signal acquisition of the GNSS Tracker 118, such as described above. Other examples of a process for using assistance data to improve receiver sensitivity is disclosed in commonly-assigned U.S. Pat. No. 6,704,651, issued Mar. 9, 2004. After being acquired, the GNSS signals can be used in various ways to produce the GNSS-Tracker position, such as the ways described above. The method 400 ends at termination block 410.

If the access SLC 112 cannot provide the assistance information at decision block 406, the method 400 proceeds to process block 412. At process block 412, the method 400 requests the assistance information from the G-SLC 106 using, for example, a TCP/IP message sent from the GNSS Tracker 118 to the G-SLC 106 at the IP address of the G-SLC 106.

At decision block 414, the method 400 queries whether the position-estimate database 138 of the G-SLC 106 contains the position estimate for the GNSS Tracker 118 based on the Cell_ID. If the cell ID is provided by the GNSS Tracker corresponds to position information in the position-estimate database 138 of the G-SLC 106, the G-SLC 106 generates the best assistance data based on the position estimate derived from the position information in the position-estimate database 138, as shown in process block 422.

If the Cell_ID is not known, is not provided, or is not correlated with the position information in the positioning-estimate database 138, the method 400 proceeds to process block 416 to attempt to determine the "best" position estimate as noted above. At process block 416, the method 400 sends, using SUPL, MLP or another communication protocol, to one or more of the foreign SLCs and/or to one or more of the legacy location servers an assistance-information request. The method 400 will select one or more of the communication protocols that are suited to handle communications among the communication and access networks 108, 140 and the GNSS Tracker 118.

At process block 418, a response is received from the foreign SLCs or legacy location servers. This response may include a position estimate corresponding to a Cell_ID or no information at all. Other possible responses might include the best-available assistance data, as noted above. At process block 420, the method 400 generates the "best" position estimate that can be produced using the best-available assistance data.

At process block 422, the method 400 uses the best position estimate (whether accurate from a Cell_ID or a "best" position estimate) to generate the "best" assistance information. Although the GNSS Tracker 118 may determine the in-view satellites from the assistance information, the GNSS Tracker 118 need not decode navigation information from the GPS signals, since the navigation information may already be in memory. As such, improvement of signal acquisition of the GPS signals results.

At process block 424, the assistance information is sent to the GNSS Tracker 118. A process block 426, the method 400 performs satellite signal acquisition using the assistance information, and in turn, determines the GNSS-Tracker position. Examples of signal acquisition and location computation may be found in commonly-assigned U.S. Pat. Nos. 6,704,651, 6,453,237, 6,417,801, 6,429,814, and 6,606,346. The method 400 ends at termination block 428.

In this manner, the G-SLC 106 acts as (i) a primary source of global assistance information when other sources are unavailable or (ii) as a secondary source of such assistance information if a primary source, such as the access SLC 112, cannot supply the assistance data to generate the assistance information. The global SLC enables the tracking of the GNSS Tracker 118 and other GNSS Trackers (not shown) anywhere in the world using high sensitivity and rapid satellite signal acquisition techniques.

Figure 5:
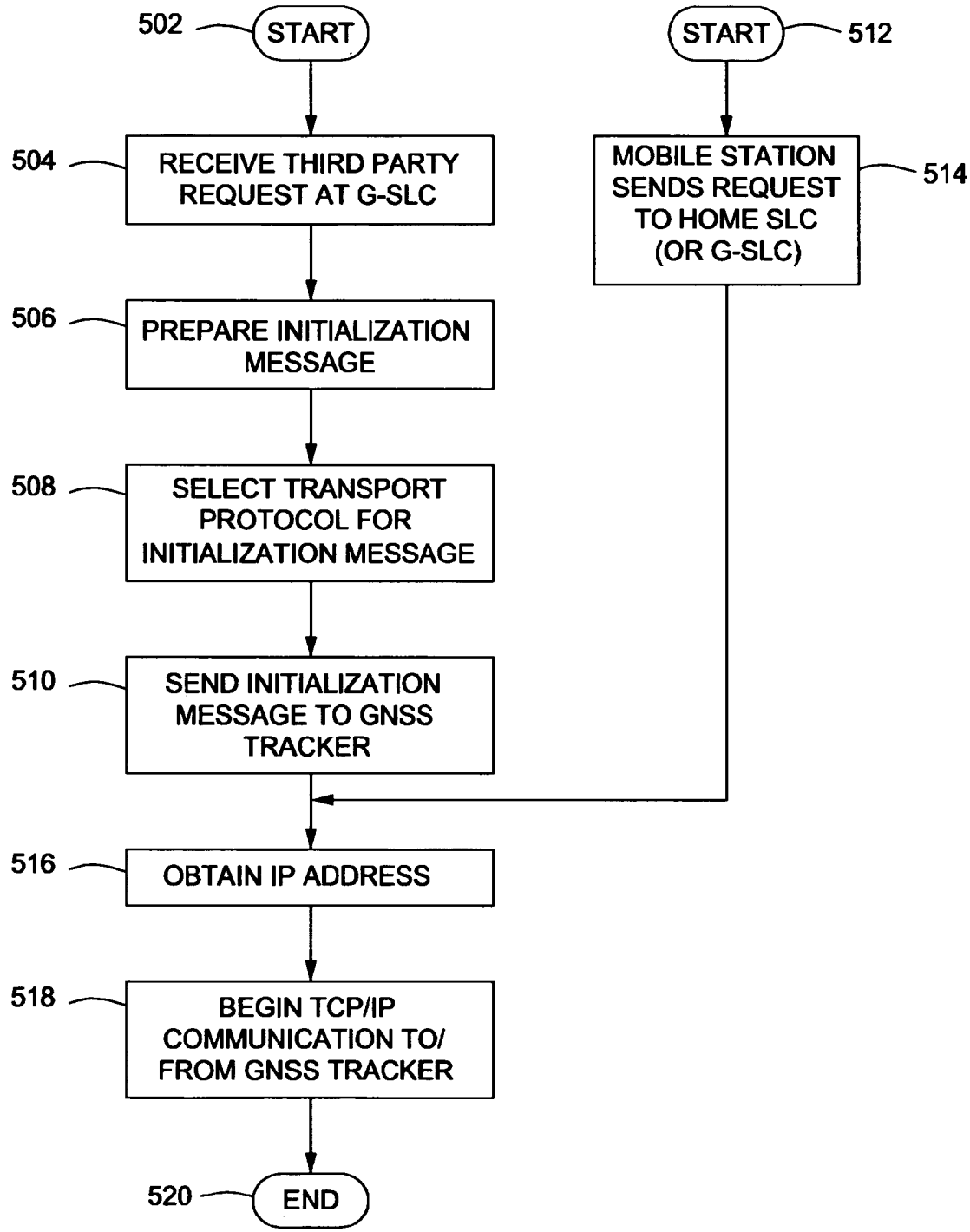
FIG. 5 is a flow diagram of one embodiment of a method for tracking a GNSS tracking device using user-plane services.

FIG. 5 is a flow diagram illustrating an example of a method 500 for tracking a GNSS Tracker, such the GNSS Tracker 118, using SUPL services. Although the method 500 may be performed by any appropriate architecture, for convenience, the method 500 is described with reference to the architecture of the system 100 of FIG. 1.

The method 500 begins at either termination block 502 or termination block 512. When starting from termination block 502, the method 500 passes to process block 504 at which the G-SLC 106 receives a GNSS-Tracking request from the third-party requester 110. The GNSS-Tracking request received at is generally exchanged using TCP/IP transported through the communication network 108 to the IP address of the G-SLC.

The third-party requestor 110 typically sends the GPS-Tracking request via a packet-data interface, such as a web portal of a service provider that provides location-based services. The GNSS-Tracking request generally includes one or more of the identifiers of the GNSS Tracker 118. These identifiers may include the MIN, the dialed number, the MDN, the ESN, the MSID, the MEID, the Ethernet address, the MAC address, the IP address, and the like.

At process block 506, the method 500 prepares an initialization or notification (collectively the "notification") message for transmission to the GNSS Tracker 118. At process block 508, the method 500 selects a transport protocol for sending the notification message. The transport protocol may include a protocol that accommodates a telephone call or an e-mail message and/or TCP/IP. The selected protocol is used at process block 510 to send the notification message to the access network 140 and on to the GNSS Tracker 118 using, for example, GPRS or other air-interface protocol.

For SMS or WAP, the dialed number of the GNSS Tracker 118 may be used to identify and address the notification message in a standard manner. For e-mail or a TCP/IP, and the IP address may be used to identify and address the notification message. However, typically, with every GPRS session, an IP address is dynamically assigned to the GNSS Tracker 118. As such, the following process blocks of the method 500 enable the G-SLC 106 to know the current IP address assigned to the GNSS Tracker.

At process block 514, upon receiving the notification message, the GNSS Tracker activates its GPS receiver 146 and also activates a GPRS session (if such a session is not already activated). The GPRS session uses a DHCP server in a conventional manner to assign the current IP address to the GNSS Tracker 118. If the notification message is sent using TCP/IP, then the G-SLC 106 must a priori know the current IP address of the GNSS Tracker 118.

Since the GNSS Tracker 118 is not assigned a static IP address, a dynamic IP address assignment process may be used. As such, a Gateway GPRS Support Node ("GGSN") of the GNSS Tracker 118, which provides the Dynamic Host Configuration Protocol ("DHCP") service to the GNSS Tracker 118 and handles all Internet traffic of the GNSS Tracker 118, assigns a "context" to the GNSS Tracker 118. That is, the GNSS Tracker 118 is assigned a Network Address Translation ("NAT") table entry.

The NAT table entry enables the GGSN to translate a generic address and port number of the GNSS Tracker 118 into an addressable port number and IP address. The GGSN may be used to send to the G-SLC 106 any updated to the current IP address of the GNSS Tracker 118. Thus, with each update of the current IP address, the G-SLC 106 is informed and can address notification messages appropriately to reach the GNSS Tracker 118.

The GNSS Tracker 118 may also send to the G-SLC 106 a periodic "hello" message via an the communication network 108 to continuously inform the G-SLC 106 of the current IP address of the GNSS Tracker 118. Alternatively, the G-SLC 106 may send to the GNSS Tracker 118 the periodic "hello" message via the communication network 108 to continuously receive the current IP address of the GNSS Tracker 118.

Alternatively, the G-SLC 106 may send the notification message in an e-mail message to an e-mail address associated with the GNSS Tracker 118. Using either a push or pull delivery, the email message, and in turn the notification message, may be sent to and received by the GNSS Tracker 118. The content or subject of the e-mail message may be notification message. Responsive to the content or subject, the GNSS Tracker 118 may initialize the SUPL session and cause the GNSS Tracker to obtain the current IP address.

In another alternative, the G-SLC 106 may place a telephone call to the GNSS Tracker 118. If the GNSS Tracker 118 may automatically or be manually answered such that a mere reception of the telephone call acts as the notification message, which in turn initializes the SUPL session and cause the GNSS Tracker to obtain the current IP address. Furthermore, the telephone call need not be answered. A mere connection of a telephone call may operate as the notification message.

After the current IP address is obtained in process block 516, the method 500 proceeds to process block 518 where TCP/IP messages to/from the mobile station are communicated using the SUPL layer. The method 500 ends at termination block 520.

If the method 500 starts at termination block 512, the GNSS Tracker 118 may initiate the tracking of the GNSS Tracker 118. At process block 514, the GNSS Tracker 118 sends to the access SLC 112 or the G-SLC 106 the GNSS-Tracking request. This GNSS-Tracking request is generally sent via the SUPL layer using a GPRS session. When the request is initiated, the GPRS session initiates the assignment of the current IP address (assuming the current IP address is not currently assigned). After the current IP address is assigned, the access SLC 112 and/or G-SLC 106 exchange messages with the GNSS Tracker 118 using the SUPL services. The method 500 ends at termination block 520.

As disclosed above, using the present invention, location-based services may be used to track a GNSS Tracker operating anywhere in the world, even when the GNSS Tracker is roaming outside of its home territory. The G-SLC 106 can provide position estimate and assistance data to the GNSS Tracker operating anywhere in the world.

While the foregoing is directed to embodiments of the present invention, other and further embodiments of the invention may be devised without departing from the basic scope thereof, and the scope thereof is determined by the claims that follow.

What is claimed is:

1. A mobile station comprising:
   charging and tracking modules adapted to be disengagably coupled together, wherein the tracking module comprises
   (i) tracking circuitry for determining at least one position of the tracking module using only a user-plane service in a satellite positioning system for wireless cellular communication, and (ii) a chargeable source for supplying power to the tracking circuitry when disengaged from the charging module, and wherein the charging module is operable to charge the chargeable source when the charging module is coupled to the tracking module; and wherein the tracking module further comprises memory for storing the at least one position of the tracking module, wherein the tracking module is operable to provide from the memory the at least one position; and wherein the tracking circuitry comprises:

(i) a first receiver for obtaining from the satellite positioning system satellite signals, and (ii) a second receiver for obtaining from the satellite positioning system, via the user plane service, assistance data for determining the position of the tracking module;

wherein the second receiver is operable to exchange with a global user-plane center:

(i) a request for the assistance data, the assistance data corresponding to a position estimate for the tracking module; and (ii) exchange with the global user-plane center the assistance data.

2. The mobile station of claim 1, wherein at least one of the satellite signals is attenuated, and wherein the tracking circuitry is operable to use the assistance data to assist the first receiver in obtaining the at least one of the satellite signals that is attenuated.

3. The mobile station of claim 1, wherein the second receiver is operable to exchange with a user-plane center (i) a request for the assistance data, the assistance data corresponding to a position estimate for the mobile station; and (ii) exchange with the user-plane center the assistance data.

4. The mobile station of claim 1, wherein the tracking circuitry further includes a processor for processing the assistance data into a form for the first receiver.

5. The mobile station of claim 1, further comprising: memory for storing the at least one position of the tracking module, wherein the tracking circuitry comprises (i) a receiver for obtaining from the satellite positioning system satellite signals, and (ii) a transceiver for (a) obtaining from the satellite positioning system assistance data for determining at least one current position of the tracking module, and (b) providing from the memory the at least one current position.

6. The mobile station of claim 1, wherein the charging module comprises circuitry for converting energy received from at least one external source into power for charging the chargeable source.

7. The mobile station of claim 6, wherein the charging module further comprises at least one first terminal for receiving the energy from a direct current source, and at least two second terminals for receiving the energy from an alternating current source.

8. The mobile station of claim 6, wherein the charging module further comprises at least two terminals for receiving the energy from an alternating current source, wherein the at least two terminals are hingedly coupled to the charging module.

9. The mobile station of claim 1, wherein the global user-plane center maintains a database of cell identifiers and corresponding position information for each of the cell identifier for network entities located substantially throughout the world.

10. The mobile station of claim 1, wherein using a user-place service further comprises using Secure User-Plane Location.

11. The mobile station of claim 1, wherein the tracking module receives a notification email from the global user-plane center, and provides the global user-plane center an IP address associated with the tracking module responsive to receiving the notification email.

12. A method of providing location-based services for a mobile station, wherein the mobile station comprises charging and tracking modules adapted to be disengagably coupled together, wherein the tracking module comprises (i) tracking circuitry for determining at least one position of the tracking module a satellite positioning system using only a user-plane service in a satellite positioning system for wireless cellular communication, and (ii) a chargeable source for supplying power to the tracking circuitry when disengaged from the charging module, and wherein the charging module is operable to charge the chargeable source when the charging module is coupled to the tracking module, the method comprising in combination:

sending from tracker module to a global user-plane center a request for assistance data, wherein the global user-plane center comprises a database containing information generating the assistance data as a function of a position estimate for the tracking module, generating at the global user-plane center the assistance data, wherein the assistance data corresponds to a position estimate for the tracking module;

sending to the tracking module the assistance data; and sending to the tracking module a notification message, wherein the notification message is operable to cause the tracking module to send the request for assistance data.

13. The method of claim 12, further comprising:

sending to at least one user-plane center a request for assistance data; and sending from the user-plane center to the global user-plane center the request for assistance data when the assistance data is not available from the user-plane center.

14. The method of claim 13, further comprising:

establishing between the tracking module and the global user-plane center, a user-plane service, wherein supplying such satellite ephemeris to the tracking module occurs the after establishing the user-plane service.

15. The method of claim 14, further comprising:

sending to the tracking module a notification message, wherein the notification message is operable to cause the tracking module to send the request for assistance data.

16. The method of claim 12, further comprising maintaining within the global user-plane center a database of cell identifiers and corresponding position information for each of the cell identifier for network entities located substantially throughout the world.

17. The method of claim 12, wherein when the position estimate is unknown, generating, as at least a portion of the assistance data, satellite ephemeris for all satellites in the satellite positioning system, and wherein supplying such satellite ephemeris to the tracking module responsive to the request for assistance data.

18. An system comprising:

a mobile station comprising:

charging and tracking modules adapted to be disengagably coupled together, wherein the tracking module comprises (i) tracking circuitry for determining at least one position of the tracking module using a satellite positioning system using only a user-plane service in a satellite positioning system for wireless cellular communication, and (ii) a chargeable source for supplying power to the tracking circuitry when disengaged from the charging module, and wherein the charging module is operable to charge the chargeable source when the charging module is coupled to the tracking module; and memory for storing the at least one position of the tracking module, wherein the tracking module is operable to provide from the memory the at least one position;

a global user-plane center for storing the at least one position received from the mobile station; and a requestor for sending a request to track the tracking module and for receiving from the global user-plane center the at least one position responsive to the request to track the tracking module.

19. The system of claim 18, wherein the tracking circuitry comprises
   (i) a receiver for obtaining from the satellite positioning system satellite signals, and
   (ii) a transceiver for
      (a) obtaining from the global user-plane center assistance data for determining generating at least one current position of the tracking module, and
      (b) providing from the memory to the global user-plane center the at least one current position.

* * * * *